(12) United States Patent
Chen et al.

(10) Patent No.: US 9,523,493 B2
(45) Date of Patent: Dec. 20, 2016

(54) DOWNLIGHT WITH ILLUMINATION ANGLE ADJUSTABLE POLYDIRECTIONALLY

(75) Inventors: You Chen, Guangdong (CN); Anmiao Li, Guangdong (CN); Huanghui Lu, Guangdong (CN); Shang Ping Xiao, Guangdong (CN)

(73) Assignee: OSRAM GmbH, Munich (DE)

( * ) Notice: Subject to any disclaimer, the term of this patent is extended or adjusted under 35 U.S.C. 154(b) by 297 days.

(21) Appl. No.: 14/004,175

(22) PCT Filed: Mar. 12, 2012

(86) PCT No.: PCT/EP2012/054194
§ 371 (c)(1),
(2), (4) Date: Sep. 10, 2013

(87) PCT Pub. No.: WO2012/126749
PCT Pub. Date: Sep. 27, 2012

(65) Prior Publication Data
US 2014/0003061 A1    Jan. 2, 2014

(30) Foreign Application Priority Data

Mar. 23, 2011    (CN) .......................... 2011 1 0077333

(51) Int. Cl.
*F21V 1/00*    (2006.01)
*F21V 29/77*    (2015.01)
(Continued)

(52) U.S. Cl.
CPC ............. *F21V 29/77* (2015.01); *B60Q 3/0253* (2013.01); *F21K 9/20* (2016.08); *F21S 8/026* (2013.01);
(Continued)

(58) Field of Classification Search
CPC . F21Y 2101/02; F21Y 2105/001; F21V 29/22; F21V 21/00; F21V 29/20; F21V 5/04; F21V 29/00; F21V 29/02; F21V 21/02; F21V 21/03; F21S 8/026; F21S 8/04; F21S 8/02; F21S 48/1145; F21S 8/00; F21S 8/066; F21K 9/30; H01L 2224/48091; H01L 2924/00014; H05K 2201/10106; A42B 3/044; Y02E 10/47
(Continued)

(56) References Cited

U.S. PATENT DOCUMENTS 5,251,118 A * 10/1993 Budnovitch et al. .......... 362/362
7,874,710 B2 * 1/2011 Tsai et al. ..................... 362/373
(Continued)

FOREIGN PATENT DOCUMENTS

CN    101363607 A    2/2009
CN    101576219 A    11/2009
(Continued)

OTHER PUBLICATIONS

English abstract of JP 2006156238 A dated Jun. 15, 2006.
(Continued)

*Primary Examiner* — Jason Moon Han
*Assistant Examiner* — Danielle Allen
(74) *Attorney, Agent, or Firm* — Viering, Jentschura & Partner mbB

(57) ABSTRACT

A downlight includes: an outer cover; a heatsink; and a light engine located between the outer cover and the heatsink, wherein the light engine is at least partially spherical; the heatsink has a hemispherical inner surface that matches with the spherical portion of the light engine; the outer cover and the heatsink are assembled together by an elastic extension member, thereby making the hemispherical inner surface of the heatsink in contact with the spherical portion of the light
(Continued)

engine; the downlight includes a pin provided near the elastic extension member, with one end of the pin fixed to the heatsink and the other end extending through the outer cover. Pressing the end of the pin that extends through the outer cover, the elastic extension member is further extended to separate the heatsink and the light engine so that the illumination angle of the light engine can be adjusted.

9 Claims, 3 Drawing Sheets

(51) Int. Cl.
| | | |
|---|---|---|
| *F21S 8/02* | (2006.01) | |
| *F21V 14/02* | (2006.01) | |
| *F21V 21/30* | (2006.01) | |
| *F21V 29/00* | (2015.01) | |
| *B60Q 3/02* | (2006.01) | |
| *F21V 29/70* | (2015.01) | |
| *F21V 29/71* | (2015.01) | |
| *F21V 29/73* | (2015.01) | |
| *F21Y 101/00* | (2016.01) | |

(52) U.S. Cl.
CPC ................. *F21V 1/00* (2013.01); *F21V 14/02* (2013.01); *F21V 21/30* (2013.01); *F21V 29/004* (2013.01); *F21V 29/70* (2015.01); *F21V 29/713* (2015.01); *F21V 29/73* (2015.01); *F21Y 2101/00* (2013.01); *F21Y 2105/10* (2016.08); *F21Y 2115/10* (2016.08)

(58) Field of Classification Search
USPC .... 362/249.02, 294, 84, 373, 147, 218, 145, 362/240; 361/709; 439/11
See application file for complete search history.

(56) References Cited

U.S. PATENT DOCUMENTS

2005/0174780 A1\* 8/2005 Park ............................. 362/294
2009/0290349 A1\* 11/2009 Chu et al. ................ 362/249.02

FOREIGN PATENT DOCUMENTS

| DE | 8608554 U1 | 5/1986 |
| DE | 102008005697 A1 | 7/2009 |
| EP | 1906078 A1 | 4/2008 |
| JP | 2006156238 A | 6/2006 |
| WO | 2009092405 A1 | 7/2009 |
| WO | 2010061331 A2 | 6/2010 |

OTHER PUBLICATIONS

Chinese Office Action based on Application No. 201110077333.0 (5 Pages and 6 pages of English translation) dated Jul. 28, 2015 (Reference Purpose Only).

\* cited by examiner

DOWNLIGHT WITH ILLUMINATION ANGLE ADJUSTABLE POLYDIRECTIONALLY

RELATED APPLICATIONS

The present application is a national stage entry according to 35 U.S.C. §371 of PCT application No.: PCT/EP2012/054194 filed on Mar. 12, 2012, which claims priority from Chinese application No.: 201110077333.0 filed on Mar. 23, 2011.

TECHNICAL FIELD

Various embodiments relate to an illumination device, and more particularly, to a downlight that with illumination angle adjustable polydirectionally.

BACKGROUND

As a common indoor lighting luminaire, downlights are widely used in offices, halls, marketplaces, etc. Generally, the downlights are mounted in ceilings or walls in an embedded manner, such that uniformity and perfection of the building decoration is achieved.

For most of the current downlights, the illumination angle thereof cannot be adjusted after they are mounted, and they can only irradiate light beams in one direction.

Recently, there occur downlights with an adjustable illumination angle, as shown in FIG. 1. In the downlight shown in FIG. 1, a light engine and a heatsink, which are combined together and cannot be separated, are connected to a case by a pin, and the illumination angle thereof can be adjusted by rotating around the axis of the pin. However, the illumination angle of such downlight can only be adjusted in one direction, as shown by the arrow in FIG. 1. Moreover, in such a downlight, space should be reserved for the light engine and the heatsink to swing so as to adjust the angle, and thus the size of the heatsink is limited. Further, the case cannot serve to dissipate heat, like a conventional downlight with an unadjustable illumination angle. Accordingly, the heat dissipation effect of the downlight is poor.

Therefore, current downlights cannot meet the requirements in some places which need to adjust the illumination angle polydirectionally.

SUMMARY

Various embodiments provide a downlight that can adjust the illumination angle polydirectionally.

Various embodiments provide a downlight that comprises an outer cover, a heatsink and a light engine located between the outer cover and the heatsink, wherein the light engine is at least partially spherical; the heatsink has a hemispherical inner surface that matches with the spherical portion of the light engine; the outer cover and the heatsink are assembled together by an elastic extension member, thereby making the hemispherical inner surface of the heatsink in contact with the spherical portion of the light engine; the downlight further comprises a pin provided in the vicinity of the elastic extension member, with one end of the pin fixed to the heatsink and the other end thereof extending through the outer cover, and by pressing the end of the pin that extends through the outer cover, the elastic extension member is further extended to separate the heatsink and the light engine so that the illumination angle of the light engine can be adjusted.

For the downlight according to the disclosure, the illumination angle thereof can be adjusted in any direction as needed, and it is quite simple to operate. Besides, since there is a large, tightly-contacting surface between the light engine and the heatsink, a good heat dissipation performance can always be maintained.

Preferably, the elastic extension member is an extension spring.

Preferably, the number of the pins is two, and the pins are symmetrically arranged in the downlight. Preferably, two elastic extension members are symmetrically provided on both sides of each of the pins.

Preferably, the pins and the elastic extension members are arranged in parallel.

Preferably, the heatsink includes a hemispherical portion having the hemispherical inner surface and a plurality of fins formed at the outer circumference of the hemispherical portion. In this way, a larger heat dissipation area is provided, thereby further improving the heat dissipation quality of the downlight.

Preferably, the outer cover is in a ring form, and an inner diameter of the outer cover is smaller than an outer diameter of the spherical portion of the light engine.

Preferably, the light engine is a LED light engine.

Preferably, the LED light engine comprises a housing having a spherical contour and an opening, an aluminum substrate provided in the housing, a LED light source provided on the aluminum substrate, and a transparent lampshade mounted at the opening of the housing.

Preferably, the transparent lampshade and the housing are assembled together by a threaded structure.

BRIEF DESCRIPTIONS OF THE DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

The following detailed description refers to the accompanying drawing that show, by way of illustration, specific details and embodiments in which the disclosure may be practiced.

Figure 1:
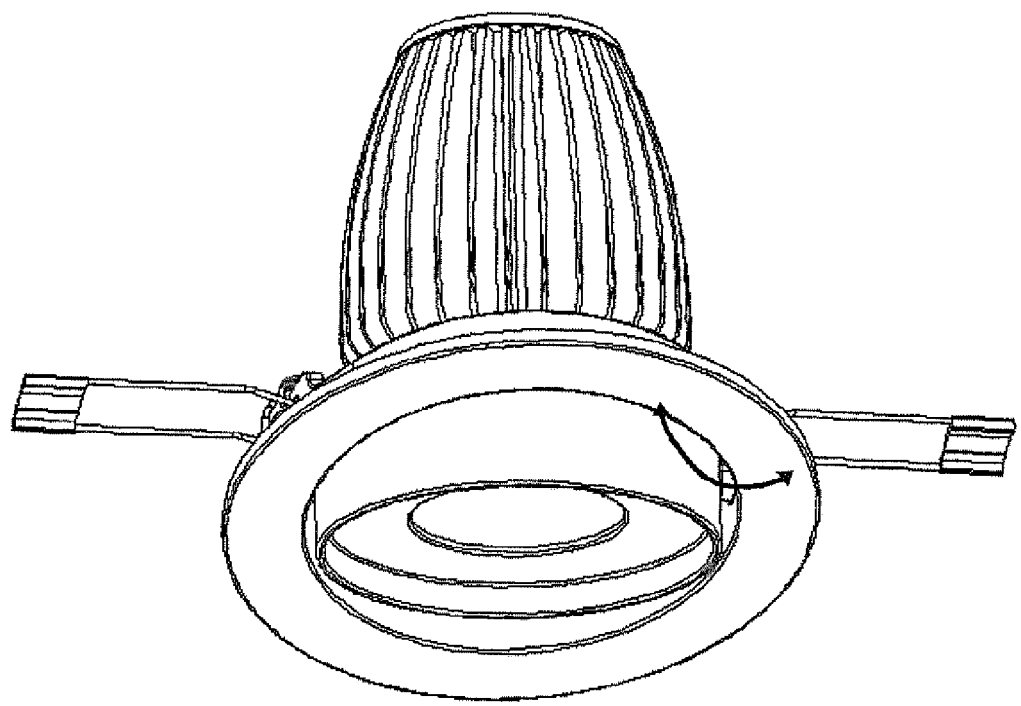
FIG. 1 shows a perspective view of a downlight with an illumination angle that can be adjusted only in one direction.
Figure 2:
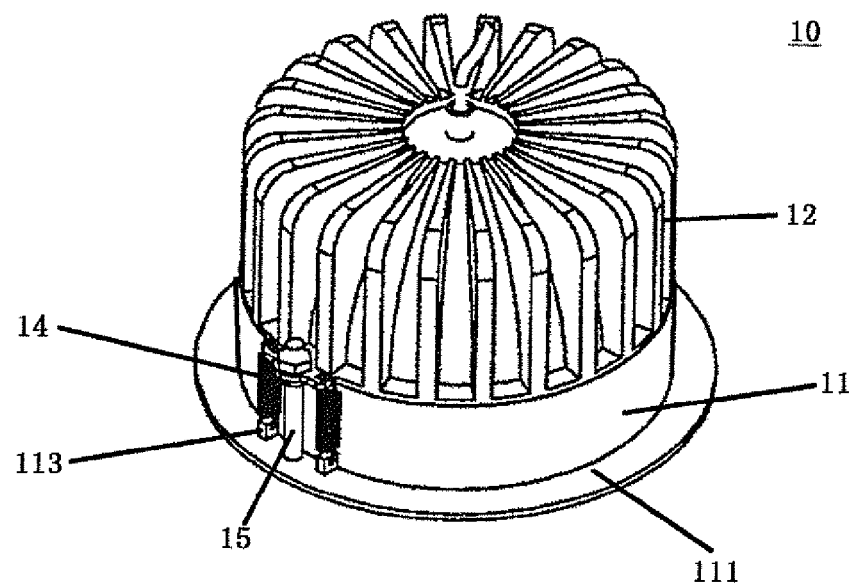
FIG. 2 shows a perspective view of a downlight according to a preferred embodiment of the disclosure.
Figure 3:
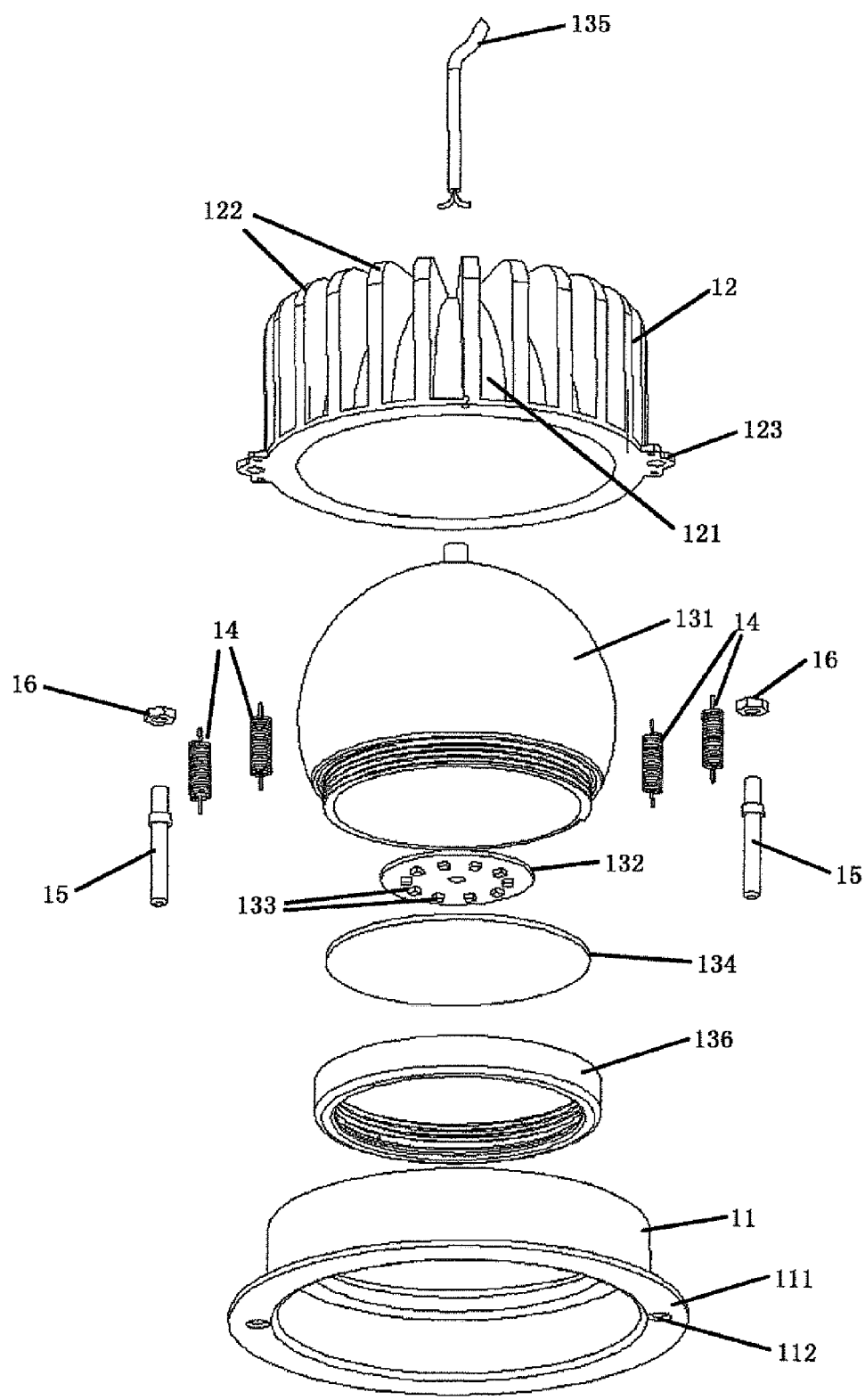
FIG. 3 shows an exploded perspective view of the downlight in FIG. 2.

As shown in FIGS. 2 and 3, according to a preferred embodiment of the disclosure, a downlight 10, the illumination angle of which can be adjusted polydirectionally, is provided. The downlight 10 comprises an outer cover 11, a heatsink 12, and a light engine 13 located between the outer cover 11 and the heatsink 12.

The downlight 10 shown in FIGS. 2 and 3 has a cylindrical contour on the whole. However, it should be understood that the disclosure is not limited to this shape. The downlight of the disclosure may also have contours of other shapes, such as square, polyhedral, etc. To facilitate description of the disclosure, the present application takes only the downlight with a cylindrical contour as example for illustration.

As shown in FIGS. 2 and 3, preferably, the outer cover 11 is in a ring form, and has at its lower portion a flange 111 extending outwardly. As is well known to those skilled in the art, after the downlight 10 is mounted in the ceiling or wall, the flange 111 covers the periphery of the mounting hole. The light engine 13 is supported by the outer cover 11.

Figure 5A:
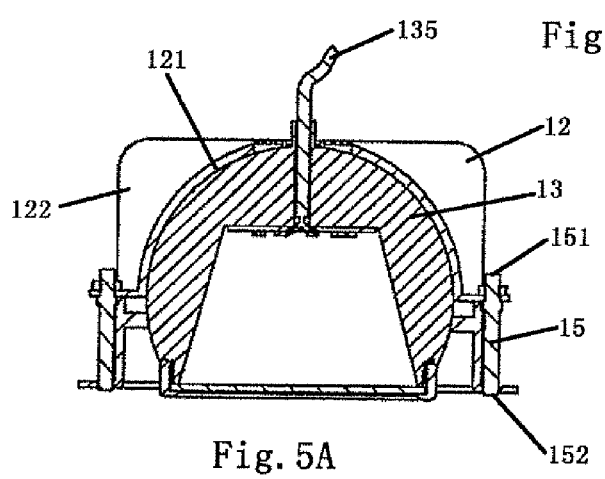
FIGS. 5A and 5B show a sectional view of the inside structures of the downlight and light engine according to the preferred embodiment of the disclosure.

The outer cover 11 and the heatsink 12 are assembled together by an elastic extension member 14. The downlight 10 further comprises a pin 15 provided in the vicinity of the elastic extension member 14. Preferably, the elastic extension member 14 and the pin 15 are provided at the outer circumference of the outer cover 11. Specifically, as shown in FIGS. 2, 3 and 5A, protrusions 113, 123 may respectively be provided at the flange 111 of the outer cover 11 and the outer circumference of the heatsink 12, for fixing the elastic extension member 14. One end 151 of the pin 15 is fixed to the protrusion at the outer circumference of the heatsink 12, with no limitation to the fixation manner, e.g., by welding or threaded connection (by means of a nut 16, for example). The other end 152 of the pin 15 extends through a hole 112 in the flange 111 of the outer cover 11. It should be understood that this assembling manner is merely a preferred embodiment of the disclosure, and the disclosure is not limited to this manner. For example, in an alternative embodiment, the elastic extension member 14 and the pin 15 may be provided at the inner side of the outer cover 11 and the heatsink 12.

Any suitable elastic extension members may be used, such as an extension spring, an elastomer, etc., and the elastic extension member is fixed in a suitable fixation manner. Preferably, the elastic extension member 14 is an extension spring. The two ends of the extension spring may respectively be fixed into the holes formed in the protrusions 113, 123.

Preferably, the number of the pins 15 is at least two, and the pins 15 are arranged along the outer circumference of the outer cover 11 at uniform intervals. Preferably, two elastic extension members 14 are symmetrically provided at both sides of each of the pins 15.

Preferably, the pins 15 and the elastic extension members 14 are arranged in parallel.

Figure 4:
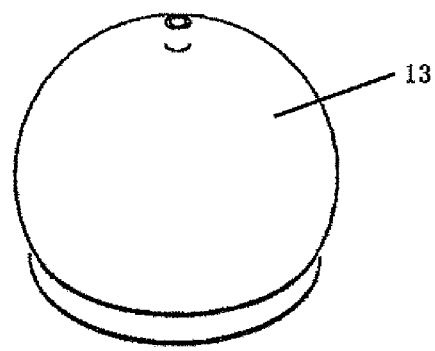
FIG. 4 shows a perspective view of the light engine of the downlight according to the preferred embodiment of the disclosure.

FIG. 4 is a perspective view of the light engine 13 of the downlight 10 according to the preferred embodiment of the disclosure. As shown in FIG. 4, the light engine 13 used in the disclosure is at least partially spherical. In the downlight 10 of the disclosure, the light engine 13 and the heatsink 12 are separate in structure. In other words, the light engine 13 and the heatsink 12 are not integral. The light engine 13 is preferably a LED light engine, while a conventional light engine may also be used. Except for the shape, the disclosure does not have any special restriction to the light engine.

Figure 5B:
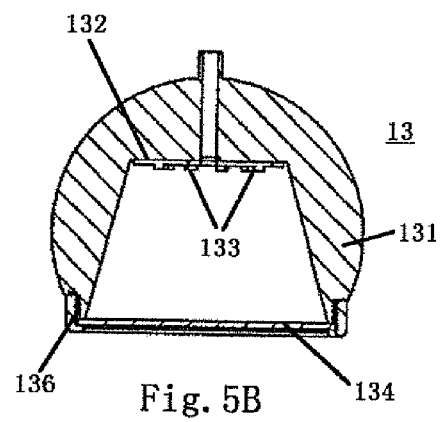

FIGS. 5A and 5B, with a sectional view, show the inside structures of the downlight 10 and the light engine 13 according to the preferred embodiment of the disclosure. As shown in FIGS. 5A and 5B, the light engine 13 is at least partially spherical. The heatsink 12 has a hemispherical inner surface matching with the spherical portion of the light engine 13. Under a circumstance where the heatsink 12 and the outer cover 11 are assembled together by the elastic extension member 14, the hemispherical inner surface of the heatsink 12 and the spherical portion of the light engine 13 contact with each other by the elastic force of the elastic extension member 14, so that the heatsink 12 provides the light engine 13 with good heat dissipation.

Preferably, as shown in FIGS. 2-3 and 5A, the heatsink 12 comprises a hemispherical portion 121 having a hemispherical inner surface and a plurality of fins 122 formed at the outer circumference of the hemispherical portion 121. Preferably, the heatsink 12 has a cylindrical contour on the whole, and such form may provide a larger heat dissipation area.

As mentioned above, the disclosure does not have any other special restriction to the light engine 13, except for the requirement for an at least partially spherical shape of the light engine. The light engine 13 may have the same constitution structure as a common light engine. For example, as shown in FIGS. 5A and 5B, the light engine 13 comprises: a housing 131 having a spherical contour and an opening, an aluminum substrate 132 provided in the housing 131, a LED light source 133 provided on the aluminum substrate 132, and a transparent lampshade 134 mounted at the opening of the housing 131. The LED light source 133 may be connected to a power line by an input line 135. Preferably, the transparent lampshade 134 and the housing 131 are assembled together by a threaded structure or a threaded part 136.

As shown in FIGS. 3 and 5A, the outer cover 11 of the downlight 10 is, preferably, further provided with a flange extending inwardly, and the size of the opening thereof (e.g., the inner diameter in a ring structure) is smaller than the outer diameter of the housing 131 of the light engine 13, so that the light engine 13 can be supported by the outer cover 11.

Figure 6A:
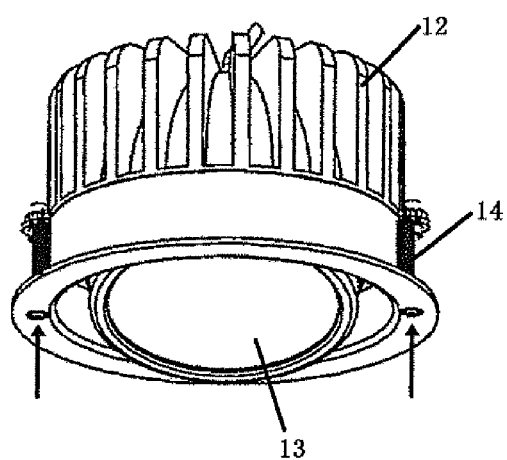
FIGS. 6A and 6B show a schematic perspective view of the light engine at different illumination angles in the downlight of the disclosure.
Figure 6B:
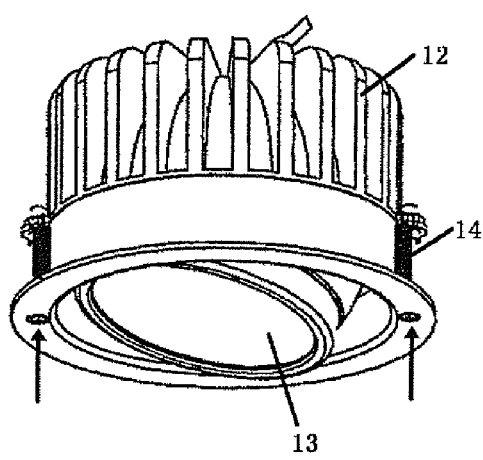

The following describes, by reference to FIGS. 6A-6B, how the illumination angle of the downlight of the disclosure can be adjusted polydirectionally.

As mentioned above, the light engine 13 and the heatsink 12 are kept in contact with each other by the elastic force of the elastic extension member 14. As shown in FIGS. 6A-6B, by pressing the end 152 of the pin 15 that extends through the outer cover 11 in the arrow direction, the elastic extension member 14 is further extended, so that the heatsink 12 and the light engine 13 are separated and do not keep in tight contact with each other, and whereby the illumination angle of the light engine 13 can be adjusted in any direction. After the light engine 13 is adjusted to the desired illumination angle, the pin 15 is loosened. Then under the elastic force of the elastic extension member 14, the light engine 13 and the heatsink 12 are kept in tight contact with each other again. FIGS. 6A and 6B show the states where the light engine in the downlight of the disclosure is adjusted to different illumination angles.

With the above structure, the illumination angle of the light engine 13 may be adjusted as desired, and it is quite simple to operate. Besides, whatever illumination angles the light engine 13 has, there is a large, tightly-contacting surface between the light engine 13 and the heatsink 12, so that a good heat dissipation performance may always be achieved.

While the disclosed embodiments has been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

The invention claimed is:

1. A downlight, comprising:
an outer cover;
a heatsink; and
a light engine located between said outer cover and said heatsink,
wherein said light engine is at least partially spherical and comprises:
a housing having a spherical contour and an opening and a LED light source provided inside said housing;
said heatsink disposed outside said housing and having a hemispherical inner surface that matches with a spherical portion of said housing; said outer cover and said heatsink are assembled together by at least one elastic extension member, thereby making the hemispherical inner surface of said heatsink in contact with the spherical portion of said housing; said downlight further comprising at least one pin provided in the vicinity of said elastic extension member, with one end of said pin fixed to said heatsink and the other end thereof extending through said outer cover, and by pressing the end of the pin that extends through said outer cover, said elastic extension member is further extended to separate said heatsink and said light engine so that the illumination angle of said light engine can be adjusted.

2. The downlight according to claim 1, wherein said elastic extension member is an extension spring.

3. The downlight according to claim 1, wherein the number of the pins is two, and said pins are symmetrically arranged in said downlight, and two said elastic extension members are symmetrically provided on both sides of each pin.

4. The downlight according to claim 1, wherein said pins and said elastic extension members are arranged in parallel.

5. The downlight according to claim 1, wherein said heatsink comprises a hemispherical portion having said hemispherical inner surface and a plurality of fins formed at the outer circumference of said hemispherical portion.

6. The downlight according to claim 1, wherein said outer cover is in a ring form, and an inner diameter of said outer cover is smaller than an outer diameter of the spherical portion of said light engine.

7. The downlight according to claim 1, wherein said light engine is a LED light engine.

8. The downlight according to claim 7, wherein said light engine comprises: an aluminum substrate provided in said housing; the LED light source provided on said aluminum substrate; and a transparent lampshade mounted at the opening of said housing.

9. The downlight according to claim 8, wherein said transparent lampshade and said housing are assembled together by a threaded structure.

\* \* \* \* \*